(12) United States Patent
Hinderthür et al.

(10) Patent No.: US 12,542,612 B2
(45) Date of Patent: Feb. 3, 2026

(54) NETWORK NODE FOR A COHERENT OPTICAL WDM TRANSMISSION NETWORK

(71) Applicant: Adtran Networks SE, Meiningen (DE)

(72) Inventors: Henning Hinderthür, Finning (DE); Cornelius Fürst, Fürstenfeldbruck (DE)

(73) Assignee: Adtran Networks SE, Meiningen (DE)

(*) Notice: Subject to any disclaimer, the term of this patent is extended or adjusted under 35 U.S.C. 154(b) by 238 days.

(21) Appl. No.: 18/370,199

(22) Filed: Sep. 19, 2023

(65) Prior Publication Data

US 2024/0097793 A1 Mar. 21, 2024

(30) Foreign Application Priority Data

Sep. 20, 2022 (EP) .................................... 22196641

(51) Int. Cl.
*H04B 10/61* (2013.01)
*H04B 10/50* (2013.01)
(Continued)

(52) U.S. Cl.
CPC ........ *H04B 10/616* (2013.01); *H04J 14/0201* (2013.01); *H04B 10/50* (2013.01); *H04B 10/60* (2013.01)

(58) Field of Classification Search
None
See application file for complete search history.

(56) References Cited

U.S. PATENT DOCUMENTS 6,519,060 B1 2/2003 Liu
8,625,994 B2 * 1/2014 Archambault ..... H04Q 11/0005
398/43

(Continued)

FOREIGN PATENT DOCUMENTS

EP 2919404 A1 9/2015

*Primary Examiner* — Darren E Wolf
(74) *Attorney, Agent, or Firm* — The Webb Law Firm

(57) ABSTRACT

Provided is a network node for a coherent optical wavelength division multiplex (WDM) transmission network including at least one remote port which is adapted to receive from and/or output to neighboring network nodes an optical WDM signal including one or more optical channel signals each lying within an optical channel of an optical WDM transmission band and a predetermined number N of local ports, each local port being adapted to receive from a dedicated coherent optical transmitter an optical add channel signal which is to be integrated in an optical WDM signal that is output at a remote port and/or each local port being adapted to output to a respective dedicated optical receiver an optical drop channel signal. The network node includes an optical router device that defines the at least one remote port and further defines an internal remote port, the optical router device being configured to route one or more selected or all optical channel signals included in the optical WDM signal received at a selected remote port as optical drop channel signals to the internal remote port and/or to route one or more optical add channel signals received at the internal remote port to one or more selected remote ports or to all remote ports. The network node further includes a passive optical filter device which is connected, at an internal remote port of the passive optical filter device, to the internal remote port of the optical router device, and which further defines the predetermined number N of local ports. The passive optical filter device is configured to define N optical bandpass filter functions each of which describes a bandpass filter characteristic between the internal remote port of the passive optical filter device and a selected, respectively differing local port. The passband of each optical bandpass filter function covers two or more neighboring optical channels. The passbands of all optical bandpass filter functions differ from each other with respect to the optical channels covered.

15 Claims, 4 Drawing Sheets

(51) Int. Cl.
*H04B 10/60* (2013.01)
*H04J 14/02* (2006.01)

(56) References Cited

U.S. PATENT DOCUMENTS

| | | | | |
|---|---|---|---|---|
| 2004/0028406 A1* | 2/2004 | Bortz | ............... | H04Q 11/0005 398/49 |
| 2013/0223794 A1* | 8/2013 | Boduch | ............... | H04J 14/0209 385/24 |
| 2018/0307119 A1* | 10/2018 | Kato | ............... | G02B 6/272 |

* cited by examiner

NETWORK NODE FOR A COHERENT OPTICAL WDM TRANSMISSION NETWORK

CROSS-REFERENCE TO RELATED APPLICATION

This application claims priority to European Patent Application No. 22196641.9, filed Sep. 20, 2022, the disclosure of which is hereby incorporated by reference in its entirety.

The invention relates to a network node for a coherent optical wavelength division multiplex (WDM) transmission network as well as to a corresponding coherent optical WDM transmission network.

A coherent optical wavelength division multiplex (WDM) transmission network, in general, comprises a plurality of network nodes, wherein a WDM transmission signal is used in order to transport information between the network nodes. The WDM transmission signal that is output at a network node and received at a neighboring network node includes one or more optical channel signals each lying within an optical channel of an optical WDM transmission band. A network node, in general, comprises at least one remote port which is adapted to receive from and/or output to neighboring network nodes an optical WDM signal including one or more optical channel signals each lying within an optical channel of an optical WDM transmission band. A network node may have two or more remote ports in case it is connected to two or more neighboring network nodes.

In order to begin and terminate an optical transmission link that uses one or more selected optical channel signals at a respective selected network node, the respective network node must have the capability of dropping one or more selected (or all) optical channel signals to the optical WDM signal that is received at a remote port and/or of adding one or more selected channel signals (or all possible channel signals of all optical channels) to an optical WDM signal that is received at one remote port and output at one or more other remote ports or of creating a fully new optical WDM signal at the respective network node by adding (i.e. combining) one or more selected optical channel signals, which is output at a selected (or the only) remote port.

The optical channel signals to be dropped at a network node are, in the following description, designated as optical drop channel signals. Likewise, the optical channel signals to be added to an optical WDM signal that is output at a remote port of a network node are, in the following description, designated as optical add channel signals.

Each network node comprises a predetermined number N of local ports, wherein each local port is adapted to receive from a dedicated coherent optical transmitter (that is connected to the respective local port) an optical add channel signal which is to be integrated in an optical WDM signal that is output at a remote port and/or to output to a respective dedicated optical receiver (that is connected to the respective local port) an optical drop channel signal.

Of course, a local port may be used in order to drop and add the respective optical drop and add signals. However, separate optical ports may be used to drop and add the respective optical drop and add signals.

It shall be noted that the terms "port", "remote port" and "local port" designate optical ports if not otherwise defined.

It goes without saying that the terms "optical channel signal" or "optical add channel signal" or "optical drop channel signal" designate optical signals that have an optical center frequency (or optical carrier frequency) that is assigned to a respective optical channel of the WDM signal and that the spectrum of the respective optical channel signal (including the modulation components) lies within the optical bandwidth that is assigned to the respective optical channel.

A known design of a network node comprises a full-spectrum filter that defines the local ports of the network node, wherein each of all optical channels that are defined for the WDM transmission network is assigned to a differing local port. For example, in case of a WDM transmission network using 96 optical channels, the full-spectrum filter defines 96 local ports, wherein at each local port a single dedicated optical channel signal can be added and/or dropped. The disadvantage of using such a full-spectrum filter, which defines a high number of local ports, is its relatively high attenuation, i.e. insertion loss. Thus, usually optical amplification is required in the respective optical path, which leads to an increased effort with respect to components and costs.

It is further known to use partial-spectrum filters, which provide a reduced number of optical channels at a network node, i.e. only predetermined optical channel signals that use the selected optical channels may be dropped and/or added at such a node.

It is also known to use a 1×N power splitter in an optical node in order to define a number of N local ports. This creates, as in case of using a full-spectrum filter, a high insertion loss, so that usually optical amplification is required. Additionally, no out-of-band noise shaping is obtained.

Thus, starting from this prior art, it is an object of the present invention to provide a network node for a coherent optical WDM transmission network that can be realized with a reduced effort with respect to circuitry and costs. It is a further object of the invention to provide a coherent optical WDM transmission network that uses corresponding network nodes.

The invention achieves these objects with the combination of features of claims 1 and 15, respectively.

Further embodiments of the invention are apparent from the dependent claims.

The invention starts from the finding that a usually required number of optical ports, e.g. twelve ports in a WDM transmission network that uses 96 optical channels, can be created by using a passive optical filter device that separates the whole optical spectrum, i.e. the full optical spectrum covering all optical channels of the WDM transmission network, into a given number of optical bands, wherein each of the optical bands is assigned to a different output port of the passive optical filter device, i.e. to a different local port of the network node.

The network node according to the present invention comprises an optical router device that defines the at least one remote port and further defines an internal remote port. The optical router device is configured to route one or more selected optical channel signals or all optical channel signals included in the optical WDM signal received at a selected remote port as optical drop channel signals to the internal remote port and/or to route one or more optical add channel signals received at the internal remote port to one or more selected remote ports or to all remote ports.

The network node according to the invention further comprises a passive optical filter device defining an internal remote port which is connected, at an internal remote port of the passive optical filter device, to the internal remote port of the optical router device, and further defining the predetermined number N of local ports.

The passive optical filter device is configured to define N optical bandpass filter functions each of which describes a bandpass filter characteristic between the internal remote port of the passive optical filter device and a selected, respectively differing local port, wherein the passband of each optical bandpass filter function covers two or more neighboring optical channels and wherein the passbands of all optical bandpass filter functions differ from each other with respect to the optical channels covered.

As already mentioned, a local port may be configured to receive optical add channel signals and to output optical drop channel signals. Instead, separate local ports may be used for receiving optical channel signals and outputting optical drop channel signals. For this purpose, the passive optical filter device may comprise separate identical optical filters or filter devices, wherein one optical filter or optical filter device is used to create the local ports (which may be referred to as optical drop ports) at which optical drop channel signals are output and another optical filter or optical filter device is used to create the local ports (which may be referred to as optical add ports) at which optical add channel signals are received.

Likewise, the optical router device may be configured to define an internal remote port which consists of two physical optical ports, wherein one of these physical optical ports is used to receive the combined optical add signals and the other of these physical optical ports is used to output the combined optical drop signals (which may comprise all optical channel signals received at the respective remote port of the network nodes).

In this way, a desired number of local ports (i.e. either separate drop ports and add ports or combined add/drop ports) can be created, wherein, at each port, the optical channel signals of two or more optical channels can be added and/or dropped. As the optical filter device has a bandwidth that covers two or more neighboring channels, sufficient band noise shaping is achieved.

Further, a flexgrid capability is achieved, as the passive optical filter device does not restrict the position of the optical channels (of course this capability must also be provided by the optical router device in order to achieve this capability for the whole network node). It would thus be possible to redefine the grid of the WDM transmission network.

In addition, optical amplification can be avoided due to the low insertion loss of the passive optical filter device, which is caused by creating a reasonable number of local ports only, instead of creating a number of local ports that equals the number of optical channels defined for the WDM transmission network.

In addition, a restricted colorless capability is obtained for the local ports (i.e. the local add ports and the local drop ports) as two or more optical channels can be added and/or dropped at each of the local ports.

Further, the network node according to the present invention can be realized with low effort with respect to circuitry and costs as rather cheap and simple white-band filter devices can be used that are available on the market. For example, such optical filter devices are used to multiplex or demultiplex CWDM (course wavelength division multiplex) channel signals in CWDM transmission networks.

It shall be noted that the optical router device and the passive optical filter device can be realized as two separate optical devices or units or as a single device or unit.

According to an embodiment of the invention, the passbands of the optical bandpass filter functions cover the full transmission band of the WDM transmission network (i.e. the total optical band that is covered by the optical channels used) and, preferably, reveal essentially the same width. In this way, channel signals of any arbitrary channel can be added and/or dropped at the network node. Optical filters that divide the full transmission band of the WDM transmission network into segments of essentially the same width are available at low costs.

According to another embodiment, neighboring optical bandpass filter functions may be chosen in such a way that the passbands of respective two neighboring optical bandpass filter functions are separated by a guard band, in which the filter attenuation of the two neighboring optical bandpass filter functions is higher than a predetermined threshold value, so that power portions of any optical signal, including noise, that lies within the guard band are suppressed.

As two or more optical channels, i.e. optical channel signals lying within the bandwidth of the respective optical channel, can be added and/or dropped at a local port that is defined by the passive optical filter device, cheap optical filters may be used, which usually reveal bandpass filter characteristics having low slopes at the edges of the passbands. Even such passive optical filter devices with no or only small guard bands can be used as no sharp separation of neighboring passbands is required. The reason for this is that the passbands may even overlap so that the same optical channel is assigned to two or more different local ports. However, usually, the same optical channel will be assigned to two or three local ports at the maximum.

However, readily available optical filter devices having optical characteristics as described above will usually have guard bands, even rather broad guard bands, in order to guarantee a sufficient separation of the passbands.

Thus, according to a further embodiment of the invention, neighboring optical bandpass filter functions may be chosen in such a way that no optical channel lies within a guard band. In this way, it is possible to guarantee that all optical channels are available for adding and/or dropping corresponding optical channel signals at the network node.

According to an alternative of a passive optical filter device, the passband of each of the optical bandpass filter functions covers a predetermined number of optical channels. The number of channels within a passband may be in the region of four to twelve channels, preferably in the region of six to ten channels.

As an example, the extended optical C-band may be used. The passive optical filter device may segment this band into twelve bands, wherein each of these bands is realized by the passband of a respective optical bandpass filter function of the passive optical filter device. In each of these twelve segments or bands, which have a 400 GHz spacing (between the center frequencies of two neighboring bands) or pitch, eight optical channels may be present. That is, twelve local ports (i.e. add and/or drop ports) are defined by such a passive optical filter device, wherein eight optical channels may be added and/or dropped at each local port. Thus, a corresponding WDM transmission network may use 96 optical channels in total. It shall be noted that in this example it was assumed that neighboring passbands do not overlap and that a guard band between two neighboring passbands is so narrow that no optical channel lies within a guard band.

In another embodiment of the invention, the passbands of neighboring optical bandpass filter functions overlap in such a way that at least one optical channel lies in a respective overlap region. In such embodiments, the at least one optical channel is available at each of the two respective neighboring ports in order to add and/or drop a respective optical channel signal.

According to an alternative of the invention, the passive optical filter device realizes a cyclic filter characteristic, wherein the passbands have an essentially constant frequency spacing and essentially the same width. Accordingly, the same number of optical channels are available at each local port.

In an embodiment of the invention, the passive optical filter device comprises a first optical filter defining a first number of local ports and a common port, wherein first optical bandpass filter functions describe the transmission characteristics of the first optical filter between its common port and the respective local ports, and a second optical filter defining a second number of local ports and a common port, wherein the second optical bandpass filter functions describe the transmission characteristics of the second optical filter between its common port and the respective local ports, and the passive optical filter device further comprises a 1×2 coupler defining a common port and two coupling ports, wherein the common port realizes the internal remote port of the passive optical filter device, and wherein one of the coupling ports is connected to the common port of the first optical filter and wherein the respective other of the coupling ports is connected to the common port of the second optical filter.

This design of the passive optical filter device increases the flexibility with respect to the filters. Especially, low-cost cyclic filters having rather large guard bands (due to a low steepness of the filter functions at both sides of the passbands) may be used. Additionally, it is also possible to use cyclic filters having a rather large frequency spacing between the passbands, although the filter functions reveal a high steepness at the edges of the passbands.

Further, passive optical filter devices of the structural design explained above may be implemented in such a way that the passbands of the first optical bandpass filter functions and the passbands of the second optical bandpass filter functions realize a fully interleaved structure, wherein the passbands of the interleaved first and second optical bandpass filter functions do not overlap.

It shall be noted that a passband of an optical bandpass filter function may be defined as the wavelength band or frequency band of the filter function in which the absolute value of the filter function exceeds a predetermined threshold value. The threshold value may be defined in such a way that the optical channel signal that reveals an optical power below the threshold value cannot be properly received, i.e. with a bit error rate lower than an acceptable threshold value.

According to another embodiment, the passbands of the first optical bandpass filter functions and the passbands of the second optical bandpass filter functions realize an overlapping interleaved structure, wherein the passbands of interleaved first and second optical bandpass filter functions are shifted versus each other in such a way that the passbands of the second optical bandpass filter functions fully cover guard bands between the passbands of the first optical bandpass filter functions and vice versa.

In case of such embodiments, the passbands of the first and second optical bandpass filter functions may have an essentially identical pitch (i.e. frequency spacing between the center frequencies).

The passbands of the first and second optical bandpass filter functions may be shifted by half of the pitch.

According to another embodiment, the network node may comprise at least one coherent optical receiver which is optically connected to a local port, wherein the optical receiver is configured to select a predetermined optical channel signal from two or more optical channel signals that are output at the local port for reception by adjusting a local oscillator frequency of an optical local oscillator comprised by the coherent optical receiver to an optical carrier frequency of the optical channel signal selected.

A coherent optical WDM transmission network according to the present invention can easily be realized by using two or more network nodes according the invention as described above, wherein all passive optical filter devices comprised by the network nodes have an identical routing property. Especially, the network nodes may comprise identical passive optical filter devices.

In the following, the invention will be described in detail with reference to the drawings. In the drawings, FIG. 1 shows a schematic block diagram of a section of a coherent optical WDM transmission network comprising three network nodes according to the invention having an add/drop capability;

Figure 1:
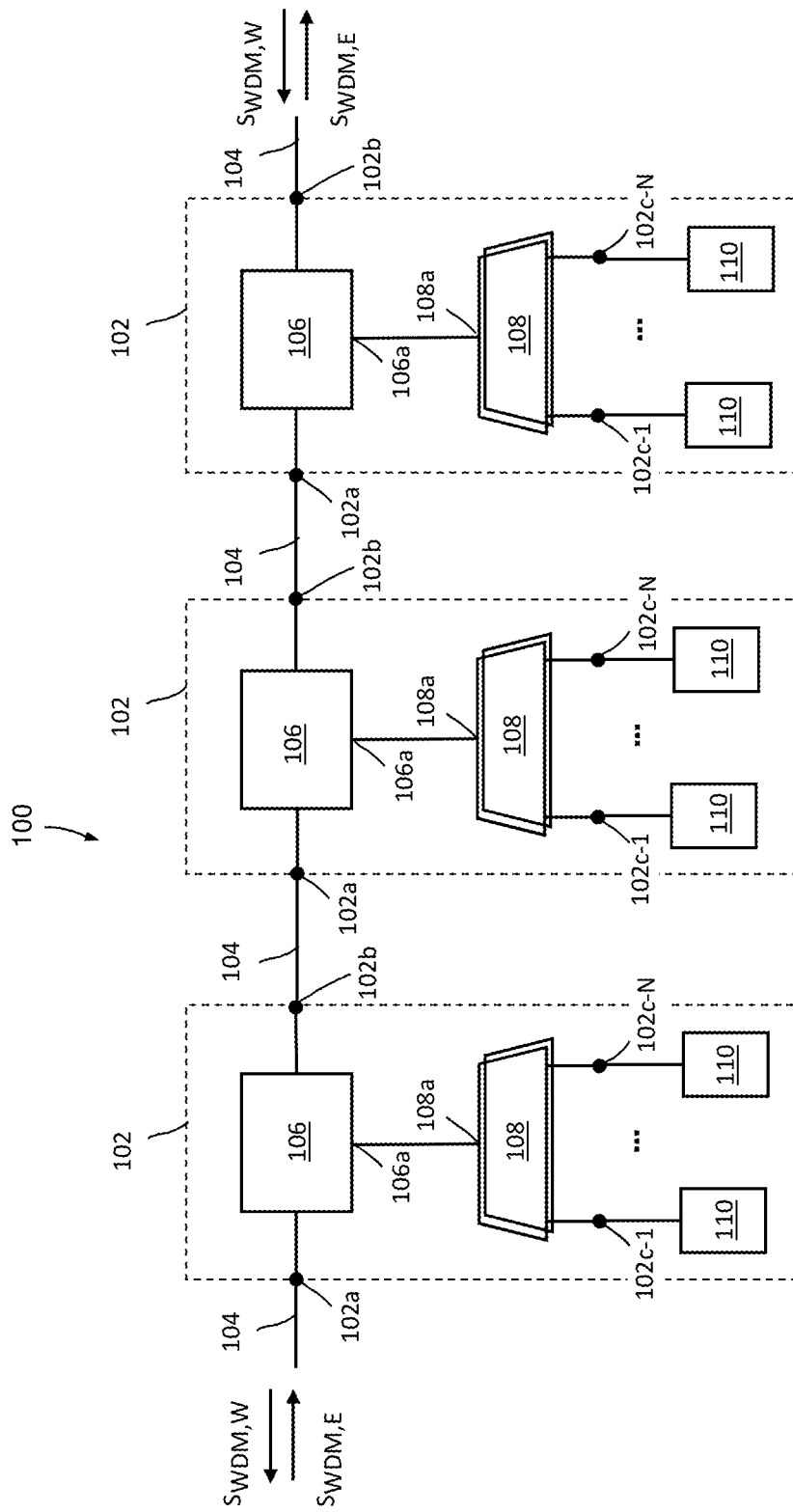

The schematic block diagram shown in FIG. 1 illustrates a portion of a coherent optical WDM transmission network 100 comprising three neighboring network nodes 102 each having a western remote port 102a, an eastern remote port 102b and a number of N local ports 102c-1 to 102-N. The directly neighboring network nodes are connected by an optical path 104, e.g. an optical single-mode fiber, wherein the optical path connects the respective Eastern and Western ports 102a and 102b.

The remote ports 102a, 102b of each network node are defined by an optical router device 106 comprised by the optical network node 102. Each router device 106 is configured to receive, at its Western remote port, an eastbound optical WDM signal $S_{WDM,E}$ and, at its eastern port, a westbound optical WDM signal $S_{WDM,W}$.

The optical WDM signals $S_{WDM,E}$, $S_{WDM,W}$ may especially be optical dense wavelength division multiplex (DWDM) signals, that comprise, at the maximum, all M optical channel signals $S_{ch-i}$ (wherein the index i is an integer number greater than or equal to 1 and lower than or equal to M) of M optical channels $CH_i$ that are defined for the coherent optical WDM transmission network 100. For example, in case the coherent optical WDM transmission network shall make use of the whole extended C-band, 96 optical channels having a channel spacing of 100 GHz may be used.

Each optical router device 106 is further configured to feed selected optical channel signals $S_{ch-i}$ of each of the optical WDM signals $S_{WDM,W}$, $S_{WDM,E}$ and to output the selected channel signals at an internal remote port 106a. In the simplest case, the optical router device 106 may be realized by an optical 1×2 coupler which taps off a predetermined power portion of the respective optical WDM signal $S_{WDM,W}$, $S_{WDM,E}$, i.e. all optical channel signals $S_{ch-i}$ are (statically) selected and fed to the internal remote port 106a. However, usually, the optical device will be realized as a means that is configured to statically select or select on-demand predetermined optical channel signals $S_{ch-i}$, i.e. the optical router device 106 is realized as an optical add/drop multiplexer (OADM) or as a reconfigurable optical add/drop multiplexer (ROADM). For this purpose, one or more wavelength selective switches (WSS) may be used within the optical router device The router device 106 may be configured to output optical channel signals $S_{ch-i}$ that have been selected from the western and eastern optical WDM signals $S_{WDM,W}$, $S_{WDM,E}$ at a single physical internal remote port 106a. However, in this case it is not allowed to select the optical channel signals $S_{ch-i}$ that are transmitted within the same optical channel $CH_i$. Therefore, the optical router device 106 usually realizes the internal remote port 106a as two or more physical ports, wherein each of the physical ports is used to output the optical channel signals $S_{ch-i}$ that are selected from one of the remote ports 102a or 102b, respectively, that is assigned to a selected physical port. Of course, in case of a network node having three or more remote ports, the internal remote port may be realized by a corresponding number of physical ports.

The internal remote port 106a of the optical router device 106 of each network node 102 is connected to an internal remote port 108a of a passive optical filter device 108 comprised by each network node 102. Each optical filter device 108 defines the N local ports 102c-1 to 102c-N. Of course, if, as described above, the optical router device 106 defines two or more physical internal remote ports that realize the internal remote port 106a, a corresponding number of two or more optical filter devices 108 will be required and comprised by the network node 102, wherein each of the optical filter devices 108 is used to process the optical channel signals $S_{ch-i}$ that have been selected from the optical WDM signal $S_{WDM,W}$, $S_{WDM,E}$ received at a dedicated remote port 102a, 102b. This property of the network nodes 102 is indicated in FIG. 1 by the representation of the optical filter devices 108 through two trapezoids that are slightly shifted versus each other.

The optical filter devices are configured to route the optical channel signals $S_{ch-i}$ to the local ports as will be described below so that each of the optical channel signals $S_{ch-i}$ is output at at least one dedicated local port.

Each local port 102c-1 to 102c-N defined by each optical filter device 108 may be connected to a coherent optical transceiver 110 which is configured to receive the optical channel signals $S_{ch-i}$ output at the respective local port 102c-1 to 102c-N. Likewise, the coherent optical transceivers 110 may also be configured to transmit a corresponding optical channel signal $S_{ch,I}$ which is received at the respective local port 102c-1 to 102c-N of the optical filter device 108 and output at the respective internal remote port of the optical filter device 108.

Of course, the network nodes 102 may in general also be configured to exclusively drop optical channel signals $S_{ch-i}$, i.e. output, at the local ports 102c-1 to 102-N, optical channel signals $S_{ch-i}$ selected from an optical WDM signal received at a remote port, or to exclusively add optical channel signals $S_{ch-I}$, i.e. receive, at the local ports 102c-1 to 102-N, optical channel signals $S_{ch-i}$ and integrate same into an optical WDM signal output at a remote port. In such a case, instead of coherent optical transceivers, coherent optical receivers or coherent optical transmitters may be provided.

According to a further embodiment (not shown in the drawings), separate optical filter devices 108 may be provided for optical channel signals to be dropped and the optical channel signals to be added. It goes without saying that also in this case separate coherent optical receivers and transmitters may be used or coherent optical transceivers that provide separate physical (optical) receive and transmit ports.

In the following, the optical characteristics of the passive optical filter device(s) 108 will be described.

In general, the invention aims at a segmentation of the whole optical band that is used by the coherent optical WDM transmission network 100 in order to define the local ports 102c-1 to 102-cN of the network nodes. The band segments, each of which is assigned to a selected different local port, are chosen in such a way that, on the one hand, a desired number of local ports is obtained and, on the other hand, sufficient noise filtering is achieved. Further, two or more optical channels $CH_i$ would be available at each local port. Selecting a desired optical channel signal $S_{ch,i}$ (even if two or more optical channel signals are output at the respective local port 102c-1 to 102c-N) may be done by the coherent receiver (simply by adjusting the local oscillator frequency to the center frequency of the desired optical channel signal $S_{ch,i}$).

As already mentioned, preferably a segmentation of the whole transmission band that is used by the coherent optical WDM transmission network is desirable. In other words, the whole transmission band used is segmented in such a way that the segments (i.e. the passbands of all filter functions FF-1 to FF-N) fully cover the transmission band.

Figure 2:
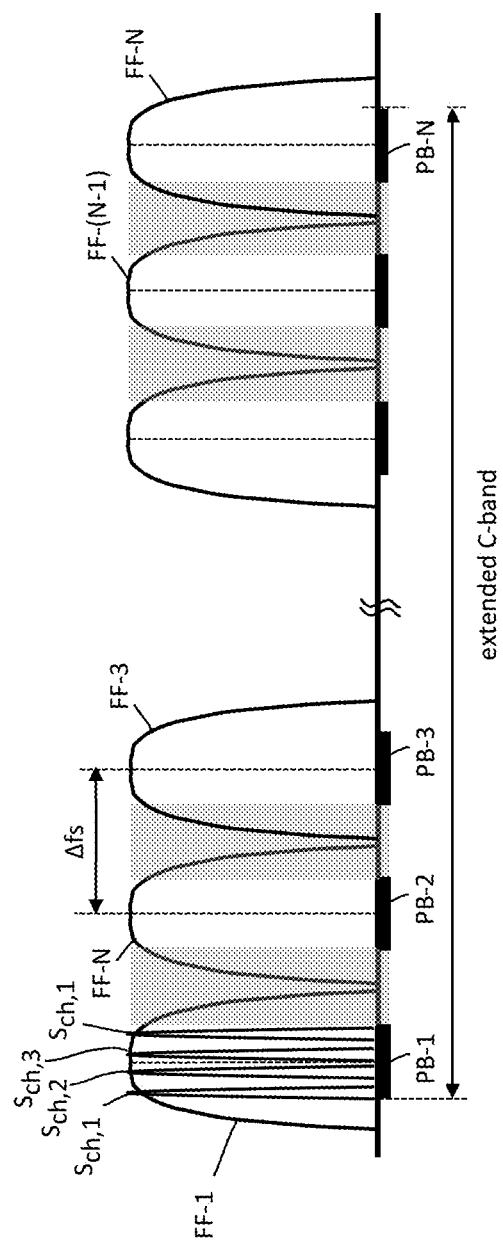
FIG. 2 shows a diagram illustrating the frequency characteristics of the passive optical filter devices comprised by each of the nodes in FIG. 1, which define the local (add/drop) ports.

In order to achieve this segmentation, CWDM (multiplexer/demultiplexer) may be used. However, as apparent from FIG. 2, such optical filter devices reveal a cyclic filter characteristic, wherein the transmissivity (i.e. the magnitude of the filter function) is low in rather broad bandwidth regions between the passbands PB-1 to PB-N. In FIG. 2, these bandwidth regions (which are designated as guard bands in this description) are illustrated in grey. In a CWD transmission network, these guard bands are necessary in order to avoid crosstalk between neighboring channels. Further, especially such low-cost CWDM filter devices have rather flat filter slopes so that the guard bands become large. This is, in general, no severe problem for CWDM transmission networks, either, as the frequency spacing of the CWDM channels is high and the bandwidth of the channel signals is decisively lower than this frequency spacing.

FIG. 2 shows a diagram illustrating, as an example, the magnitude of the N optical filter (transfer) functions FF-1 to FF-N between the internal remote port and each of the N local ports of the optical filter device 108 of each network node 102, wherein the optical filter device 108 is realized by a CWDM filter device. As apparent from this Figure, the optical filter device 108 shows the behavior of a cyclic optical bandpass filter (for the superimposed filter functions) having an essentially constant frequency spacing Δfs, wherein each passband PB-1 to PB-N is of essentially identical width. The passbands are defined by a threshold value, which must be exceeded by the magnitude of the respective optical filter function FF-1 to FF-N. In FIG. 2, this threshold value is chosen rather high as in modern coherent optical transmission systems acceptable insertion losses are low due to low launch power and low receive sensitivity of the coherent optical transceivers. As a consequence, the guard bands become broad.

If such an optical filter device 108 is used in order to define the local ports 102c-1 to 102c-N, only optical channel signals lying within the passbands PB-1 to PB-N can be correctly received at the corresponding local ports 102c-1 to 102c-N. Also transmitting optical channel signals $S_{ch,i}$ lying within guard bands is to be avoided as such channel signals would encounter high attenuation so that they might not be correctly received at the end of the respective transmission link in another network node.

As an example, FIG. 2 shows four optical channels $CH_i$ or channel signals $S_{ch,1}$ to $S_{ch,4}$ that lie within the passband of the optical filter function FF-1, which describes the transmission characteristic between local port 102c-1 and the internal remote port 108a of the passive optical filter device 108. Due to the broad guard bands, a rather high number of optical channels could not be used with an optical filter device having the transmission characteristic according to FIG. 2. Thus, the coherent optical WDM transmission network would be restricted to the number of optical channels $CH_i$ which are covered by the passbands PB-1 to PB-N of the optical filter functions FF-1 to FF-N in case all optical filter devices 108 of the network nodes 102 revealed such identical transmission characteristics.

A solution to this problem would be to design a passive optical filter device 108 that has very narrow guard bands, which would require extremely steep filter flanks outside the passbands. In general, it would be possible to manufacture such passive optical filter devices. However, the manufacturing costs would be decisively higher as compared to corresponding low-cost optical filter devices having broad guard bands.

Figure 3:
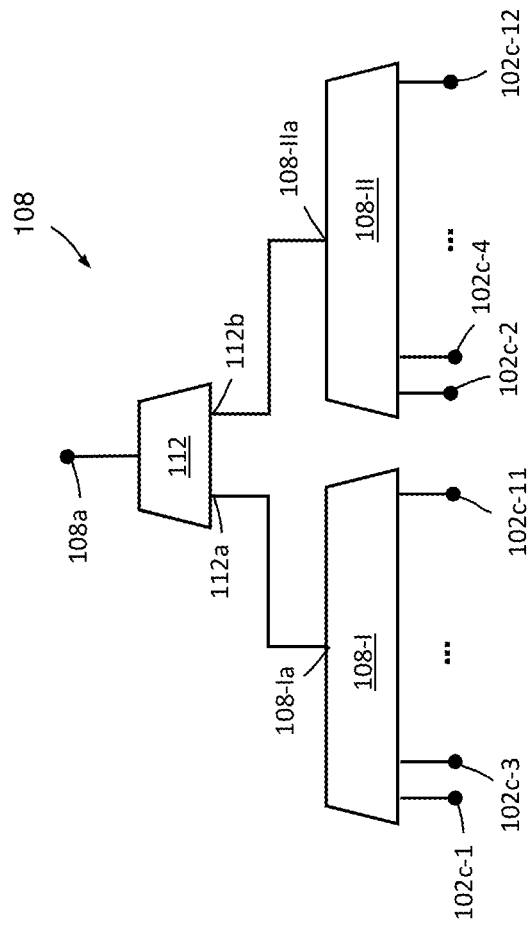
FIG. 3 shows a block diagram of a passive optical filter device comprising two cyclic optical filters the frequency characteristics of which define an interleaved passband structure.

Another solution will now be described with reference to FIGS. 3 and 4. FIG. 3 shows an embodiment of a passive optical filter device 108 that comprises two cyclic passive optical filter devices 108-I, 108-II, which may be realized as CWDM multiplexer/demultiplexer devices or in general as low-cost broadband multiplexer/demultiplexer devices. The optical filter device 108-I realizes optical filter functions according to the upper part of the diagram shown in FIG. 4, wherein the X-axes indicate the optical frequency and the Y-axes indicate the magnitude of the optical transfer function (i.e. the transmissivity) of the respective optical filter device. Likewise, the optical filter device 108-II realizes the optical filter functions according to the lower part of the diagram shown in FIG. 4. As indicated in FIG. 3, the optical filter device 108-I provides odd local ports 102c-1, 102c-3, . . . , 102c-11 and the optical filter device 108-II provides even local ports 102c-2, 102c-4, . . . , 102c-12, wherein, as an example, this embodiment realizes twelve local ports in total. However, of course, any arbitrary number of local ports may be realized in an analog manner.

Each of two multiplex/demultiplex ports 108-Ia, 108-IIa of the optical filter devices 108-I, 108-II is connected to a coupling port 112a, 112b of an optical 1×2 coupler 112. Each of the optical filter devices 108-I, 108-II is configured to receive, at each of its (odd or even) local ports 102c-1 to 102c-N, an optical channel signal $S_{CH,i}$ lying within a selected one of two or more optical channels $CH_i$, which are assigned to the respective local port. All optical channel signals $S_{CH,i}$ received are multiplexed into a partial optical WDM signal $S_{WDM,I}$, $S_{WDM,II}$ that is output at the respective multiplex/demultiplex port 108-Ia, 108-IIa. The optical coupler 112 combines the partial optical WDM signals $S_{WDM,I}$, $S_{WDM,II}$ into a combined partial optical WDM signal that is output at the internal remote port 108a that is defined by the optical coupler 112. Likewise, the optical coupler 112 according to FIG. 3 is capable of receiving any optical channel signal $S_{ch,i}$, which may be integrated in a partial optical WDM signal, at the internal remote port 108a and of demultiplexing this partial optical WDM signal by feeding same to each of the multiplex/demultiplex ports 108-Ia, 108-IIa of the optical filter devices 108-I, 108-II, wherein the respective optical filter device 108-I, 108-II demultiplexes the partial optical WDM signal received according to its filter characteristic. As a result, each of the optical channel signals $CH_i$ is output at the or any local port 102c-1 to 102c-12 that covers the respective optical channel $Ch_i$.

Of course, as explained above, the passive optical filter device 108 may be used for both transmission directions, i.e. for receiving, multiplexing and outputting optical channel signals received at the local ports 102c-1 to 102c-12 and for receiving a partial optical WDM signal that includes optical channel signals $S_{ch,i}$ to be dropped and outputting the demultiplexed optical channel signals $S_{ch,i}$ at the dedicated local ports 102c-1 to 102c-12.

Figure 4:
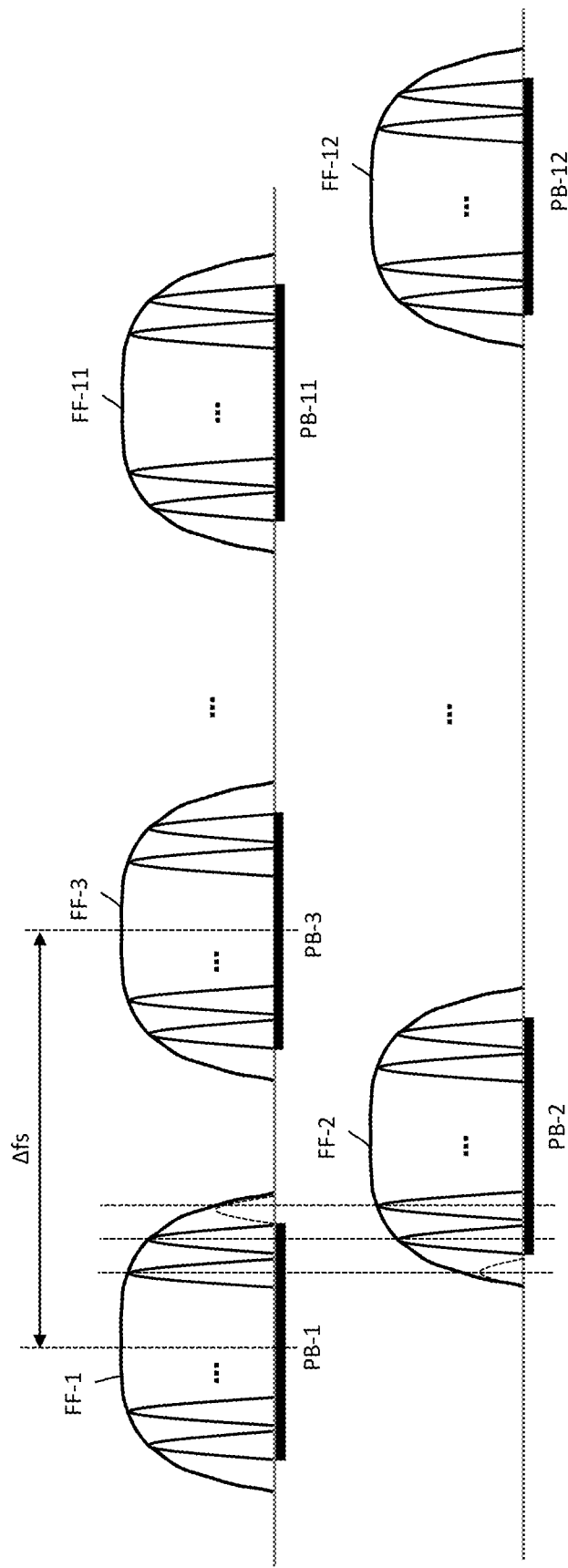
FIG. 4 shows a diagram illustrating the frequency characteristics of the cyclic optical filters of the passive optical filter device in FIG. 3.

As apparent from FIG. 4, the optical filter functions FF-i that realize the multiplex/demultiplex functionality of the passive optical filter devices 108-I and 108-II may reveal rather broad guard bands and rather flat filter edges. The optical filter functions FF-i (i=1, 3, . . . , 11) defining the odd ports and the optical filter functions FF-I (i=2, 4, . . . , 12) defining the even ports reveal the same shape, i.e. define passbands of equal width, and have a respective identical frequency spacing Δfs. However, these odd and even optical filter functions are shifted versus each other by half of the (constant) frequency spacing Δfs. In this way, it is achieved that the passbands of the odd optical filter functions realized by the passive optical filter device 108-I fully cover the guard bands between the even optical filter functions realized by the passive optical filter device 108-II and vice versa. All passbands PB-I superimposed cover the whole optical band that is used by the respective coherent optical WDM transmission network. For example, as mentioned as an example above, the whole optical band may be the extended C-band and the number N of optical channels $CH_i$ may be 96. That is, in the example according to FIGS. 3 and 4, in which twelve local ports are defined by the passive optical filter device 108, a group of (at least) eight neighboring different channels must be assigned to each local port 102c-1 to 102c-12.

It is, however, possible to assign more than eight neighboring channels to each local port due to an overlap of neighboring filter functions FF-I, as illustrated in FIG. 4. According to FIG. 4, each passband PB-i covers not only the respective eight neighboring different channels $Ch_i$ but, due to a rather large overlap, ten neighboring optical channels $CH_i$. Thus, the last optical channel covered by a given passband PB-i, i.e. the optical channel having the highest center or carrier frequency, is also covered by the immediately neighboring passband PB-(i+1) and the first optical channel covered by a given passband PB-i, i.e. the optical channel having the lowest center or carrier frequency, is also covered by the immediately neighboring passband PB-(i−1). It would, of course, also be possible to even increase the overlap so that the overlap covers not only one, but two or more optical channels (at each side of a passband, except the lower side of the first passband and the higher side of the last passband, which have no neighboring passbands).

In this way, it is possible to use low-cost filter devices having flat filter edges as passive optical filter devices 108-I and 108-II, respectively. Even such flat filter edges are sufficient to provide sufficient noise filtering in the transmit direction. As explained above, selecting a predetermined optical channel, from the group of optical channels covered by the passband of a given optical filter function, as reception channel, i.e. receiving the optical channel signal included within a predetermined optical channel may be effected by the coherent optical receiver 110 (as explained above, by adjusting the local oscillator frequency accordingly).

As illustrated in FIG. 4, it might even be possible to receive an optical channel signal $S_{CH,i}$ of an optical channel that lies outside the passband of a given filter function FF-i if the filter edge of the respective optical filter function is so flat that the respective optical channel signal is output with a sufficiently high optical power (see the channel signal illustrated by a dashed line in filter functions FF-1 and FF-2 in FIG. 4). Of course, as the case may be, such optical channel signals might even be received at both neighboring ports.

It shall be noted that the embodiment referred to in FIGS. 3 and 4 shall merely serve as an example and that the invention may also be realized using optical filter devices 108-I and 108-II having filter functions of passbands having different widths. In this case, the number of channels per passband that realize the odd and even ports may be different.

As explained above, the invention provides a simplified structure of a network node for a coherent WDM transmission network by segmenting the, preferably full, optical band that is used by the WDM transmission network into rather broad passbands assigned to the local ports. In this way, groups of two or more neighboring optical channels are assigned to each local port. The further selection of a specific channel as a receive channel is effected by the coherent optical receiver. The width of the passbands is chosen in such a way that a sufficient noise filtering is achieved in the transmit direction. The number of segments or passbands, i.e. the number of ports, is chosen in such a way that a passive optical filter device that is configured to carry out the desired multiplex/demultiplex function reveals a sufficiently low insertion loss (between the common or remote port and each of the local ports).

LIST OF REFERENCE SIGNS

100 coherent optical WDM transmission network
102 network node
102*a* western remote port
102*b* eastern remote port
102*c*-1 to 102*c*-N local port
104 optical path (optical fiber)
106 router device
106*a* internal remote port (of router device 106)
108 passive optical filter device
108*a* internal remote port (of passive optical filter device 108)
108-I passive optical filter device
108-Ia multiplex/demultiplex port
108-II passive optical filter device
108-IIa multiplex/demultiplex port
110 coherent optical transceiver
112 optical 1×2 coupler
112*a* coupling port
112*b* coupling port
M number of optical channels
N number of local ports
$CH_i$ optical channel ($1 \leq i \leq M$)
PB-1 to PB-N passband
$\Delta fs$ frequency spacing
$S_{ch,i}$ optical channel signal ($1 \leq i \leq M$)
$S_{WDM,W}$ western optical WDM signal
$S_{WDM,E}$ eastern optical WDM signal

The invention claimed is:

1. A network node for a coherent optical wavelength division multiplex (WDM) transmission network comprising
   (a) a remote port which is adapted to receive from and/or output to neighboring network nodes an optical WDM signal including one or more optical channel signals each lying within an optical channel of an optical WDM transmission band and
   (b) a predetermined number N of local ports, each of the N local ports being adapted to receive from a dedicated coherent optical transmitter an optical add channel signal which is to be integrated in the optical WDM signal that is output at the remote port and/or each of the N local ports being adapted to output to a respective dedicated optical receiver an optical drop channel signal,
   (c) wherein that the network node comprises an optical router device that defines the remote port and further defines an internal remote port, the optical router device being configured
      (i) to select and route one or more of the optical channel signals included in the optical WDM signal received at the remote port as optical drop channel signals to the internal remote port and/or
      (ii) to route one or more optical add channel signals received at the internal remote port to the remote port, and
   (d) wherein the network node further comprises a passive optical filter device which is connected, at an internal remote port of the passive optical filter device, to the internal remote port of the optical router device, and which further defines the predetermined number N of local ports,
   (e) wherein the passive optical filter device is configured to define N optical bandpass filter functions each of which describing a bandpass filter characteristic between the internal remote port of the passive optical filter device and a selected, respectively differing local port, and
   (f) wherein the passband of each optical bandpass filter function covers two or more neighboring optical channels and wherein the passbands of all optical bandpass filter functions differ from each other with respect to the optical channels covered.

2. The network node according to claim 1, wherein the passbands of the optical bandpass filter functions cover the total transmission band of the WDM transmission network and reveal the same width.

3. The network node according to claim 1, wherein neighboring optical bandpass filter functions are chosen in such a way that the passbands of respective two neighboring optical bandpass filter functions are separated by a guard band, in which the filter attenuation of the two neighboring optical bandpass filter functions is higher than a predetermined threshold value, so that power portions of any optical signal, including noise, that lies within the guard band are suppressed.

4. The network node according to claim 3, wherein neighboring optical bandpass filter functions are chosen in such a way that no optical channel lies within a guard band.

5. The network node according to claim 1, wherein the passband of each of the optical bandpass filter functions covers a predetermined number of optical channels.

6. The network node according to claim 5, wherein the predetermined number of optical channels is in the region of four to twelve or six to ten.

7. The network node according to claim 1, wherein the passbands of neighboring optical bandpass filter functions overlap and that at least one optical channel lies in a respective overlap region.

8. The network node according to claim 1, wherein the passive optical filter device realizes a cyclic filter characteristic, wherein the passbands have a constant frequency spacing and the same width.

9. The network node according to claim 1, wherein the passive optical filter device comprises a first optical filter defining a first number of local ports and a common port, wherein first optical bandpass filter functions describe the transmission characteristics of the first optical filter between its common port and the respective local ports, and a second optical filter defining a second number of local ports and a common port, wherein the second optical bandpass filter functions describe the transmission characteristics of the second optical filter between its common port and the respective local ports, and that the passive optical filter device further comprises a 1×2 coupler defining a common port and two coupling ports, wherein the common port realizes the internal remote port of the passive optical filter device, and wherein one of the coupling ports is connected to the common port of first optical filter and wherein the respective other of the coupling ports is connected to the common port of second optical filter.

10. The network node according to claim 9, wherein the passbands of the first optical bandpass filter functions and the passbands of the second optical bandpass filter functions realize a fully interleaved structure, wherein the passbands of the interleaved first and second optical bandpass filter functions do not overlap.

11. The network node according to claim 9, wherein the passbands of the first optical bandpass filter functions and the passbands of the second optical bandpass filter functions realize an overlapping interleaved structure, wherein the passbands of interleaved first and second optical bandpass filter functions are shifted versus each other in such a way that the passbands (PB-i) of the second optical bandpass filter functions fully cover guard bands between the passbands of the first optical bandpass filter functions and vice versa.

12. The network node according to claim 11, wherein the passbands of the first and second optical bandpass filter functions have identical frequency spacing.

13. The network node according to claim 12, wherein the passbands of the first and second optical bandpass filter functions are shifted by half of the frequency spacing.

14. The network node according to claim 1, wherein the network node comprises at least one coherent optical receiver which is optically connected to a local port, wherein the optical receiver is configured to select a predetermined optical channel signal from two or more optical channel signals that are output at the local port for reception by adjusting a local oscillator frequency of an optical local oscillator comprised by the coherent optical receiver to an optical carrier frequency of the optical channel signal selected.

15. A coherent optical wavelength division multiplex transmission network comprising two or more network nodes according to claim 1, wherein all passive optical filter devices comprised by the network nodes have an identical routing property, and wherein the passive optical filter devices are especially-identical.

* * * * *